United States Patent [19]
Arman

[11] 3,867,737
[45] Feb. 25, 1975

[54] MOLDED PLASTIC SUPPORT FOR WIPER BLADES OF WINDSCREEN WIPER EQUIPMENT ON MOTOR VEHICLE

[76] Inventor: Dario Arman, Piazza Adriani 15, Turin, Italy

[22] Filed: May 10, 1973

[21] Appl. No.: 358,883

[30] Foreign Application Priority Data
May 12, 1972 Italy .................................. 68487/72

[52] U.S. Cl. ........................... 15/250.42, 15/250.32
[51] Int. Cl. ............................ B60s 1/38, B60s 1/40
[58] Field of Search ....... 15/250.32, 250.33, 250.34, 15/250.35, 250.36, 250.42, 250.31

[56] References Cited
UNITED STATES PATENTS
2,649,605   8/1953   Scinta et al. ...................... 15/250.42
2,739,337   3/1956   O'Shei .............................. 15/250.42
3,405,419   10/1968  Charlton ........................... 15/250.32
3,750,227   8/1973   Hayhurst et al. ................. 15/250.42

FOREIGN PATENTS OR APPLICATIONS
1,237,692   6/1960   France ............................. 15/250.42

Primary Examiner—Peter Feldman

[57] ABSTRACT

A molded plastic support for windshield wiper blade having articulate coupling between the connecting member and main bar of the support as well as between the ends of the bar and the central point of each rocker arm, and metal plates engaging corresponding transversal seats which coincide and are formed in the articulation points.

4 Claims, 15 Drawing Figures

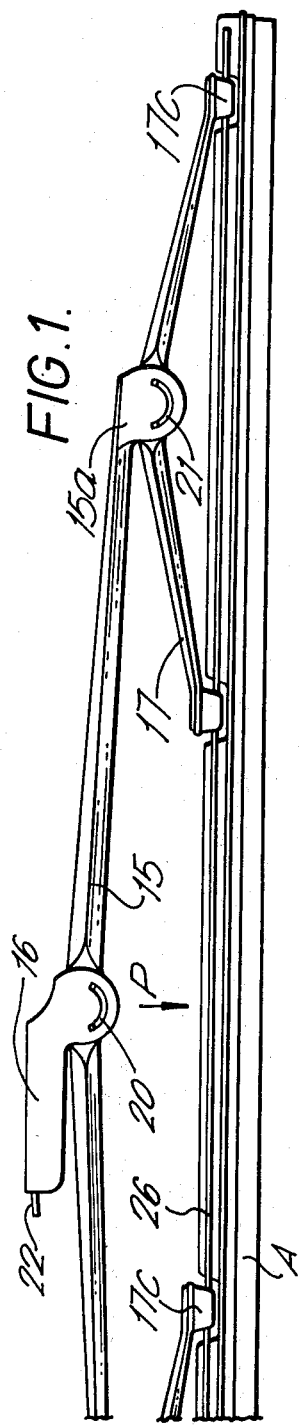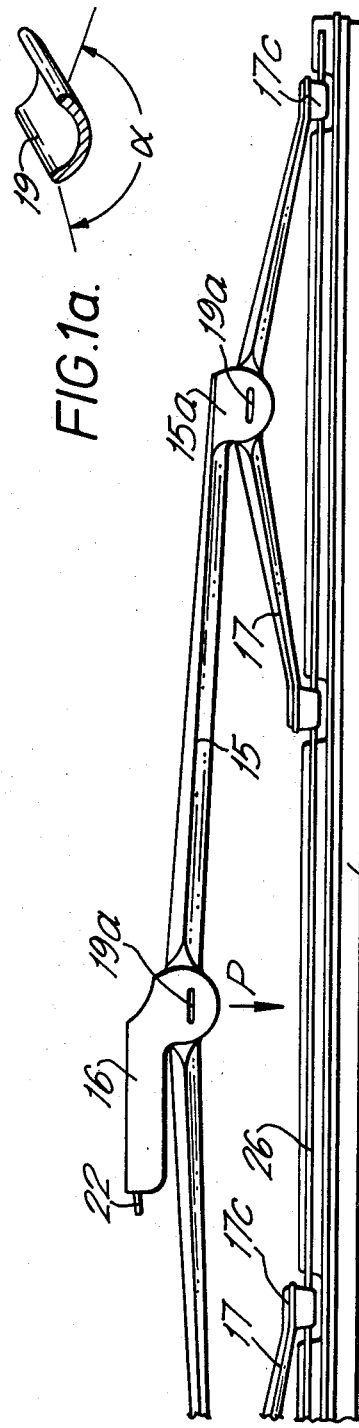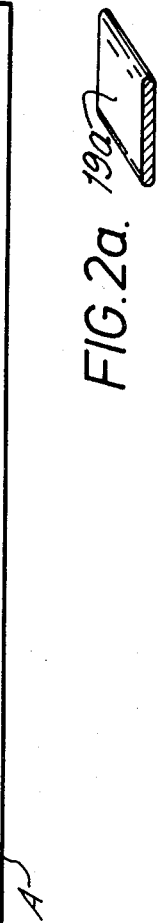

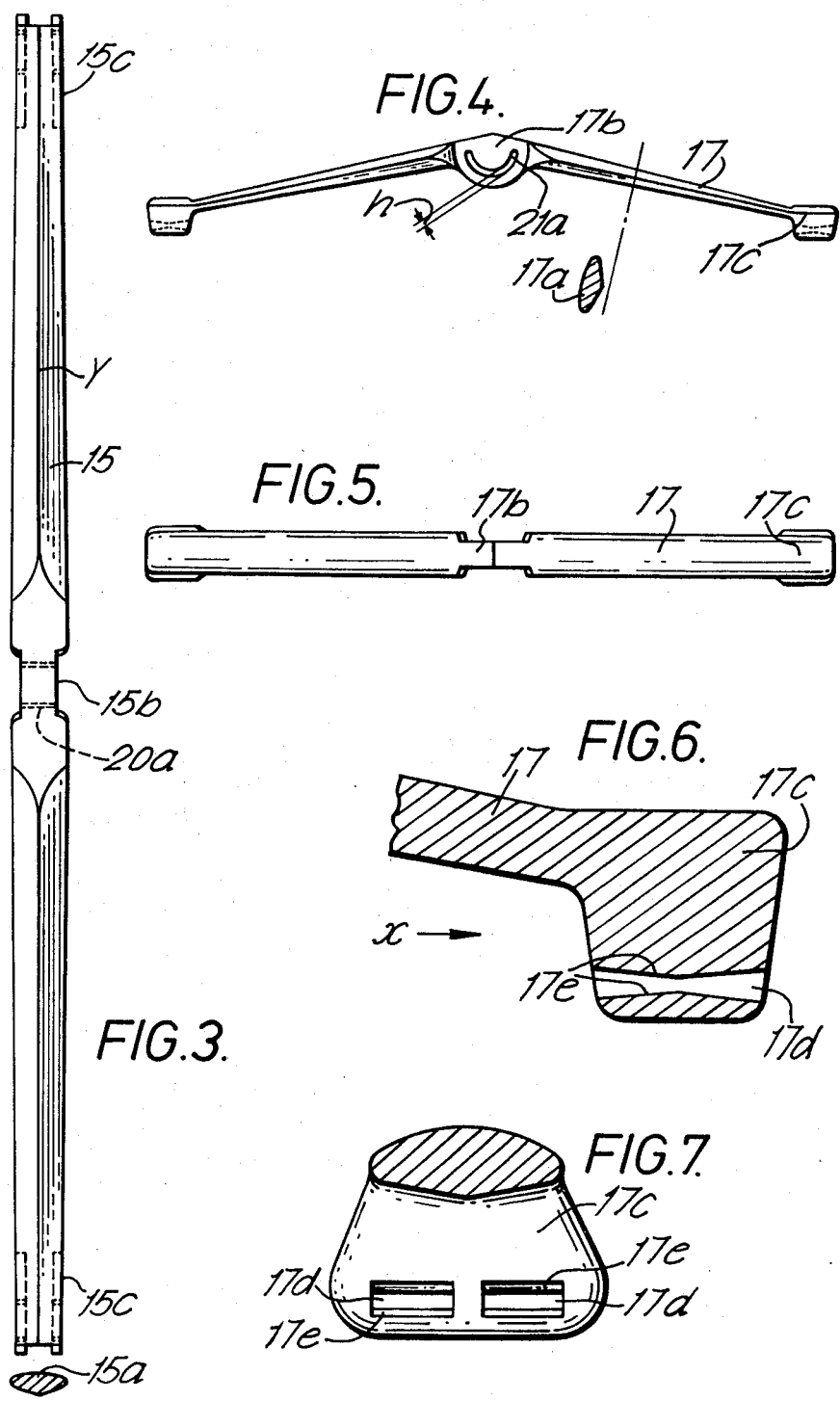

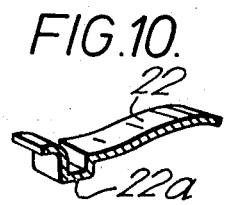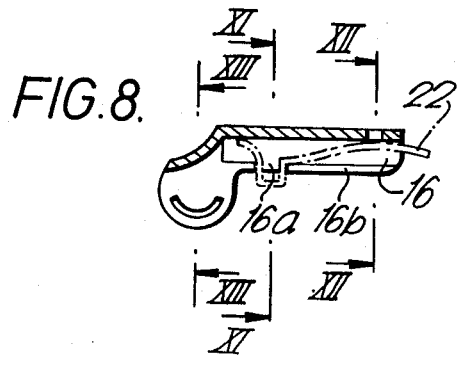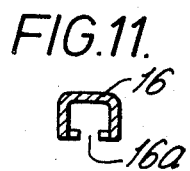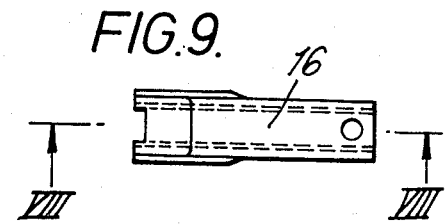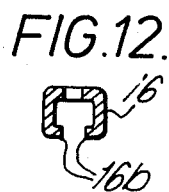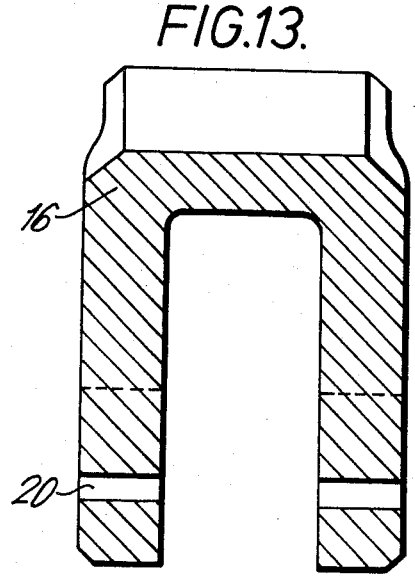

3,867,737

MOLDED PLASTIC SUPPORT FOR WIPER BLADES OF WINDSCREEN WIPER EQUIPMENT ON MOTOR VEHICLE

The main object of present invention is to provide a support for wiper blades which is weather-proof and light, which does not require finishing operations as chromium plating or painting and which is economically convenient.

In order to attain the above specified object the present invention provides a support for wiper blades wherein the members which compose it and carry by engagement the rubber wiper blade, are made of molded plastic.

As known, each support of this kind comprises a principal bar which carries a pivoted sheath for the snap connection to the end of the corresponding oscillating arm, and two rocker arms, centrally pivoted with respect to the principal bar ends, said members being all made of molded plastics are preferably, but not limitedly, of acetal resins.

Said support is characterized by the substantially elliptical outline of its cross section and given to both the principal bar and the rocker arms, and especially to the articulate connections which engage the connecting member at the middle of the principal bar as well as the articulate connections engaging the ends of said bar with respect to the central part of each rocker arm.

According to a first embodiment, said articulate connections are characterized in that they comprise a tile-shaped stainless steel plate mounted in such a way as to engage arcuated and concentric seats or cuts formed in the two parts to be pivotally connected; said plate being fixedly mounted in the seat of one of the two parts and being oscillable around the axis passing from its curvature centre, with respect to the arcuated seat of the second part, which seat is formed by a circle arc greater than that forming the seat provided in the first part.

According to a variant, the plate forming the articulation pivot is flat instead of curved; in this case while it results fixed in a corresponding seat of one of the two mutually articulated parts, it engages a seat having a central outline with opposed tips formed in the second part and results thereby oscillating with respect to said part which is allowed to move articulately with respect to the first, with an amplitude substantially equal to the angles determined by the outline with tips.

Wider and more clear features will result from the following specification referred to the accompanying drawings as a demonstrative and not limiting example, wherein:

FIGS. 1 and 2 illustrate in a partial side view two windshield wipers with supports according to the invention;

FIGS. 1a and 2a illustrate in a detailed perspective view, the shape of the articulation plates used in the support respectively represented on FIG. 1 and FIG. 2;

FIG. 3 is a top plan view of the support principal bar;

FIGS. 4 and 5 are a top plan view and a side view respectively, of a rocker arm;

FIG. 6 is a longitudinal section view, in a greater scale, of a rocker arm end according to the mentioned variant;

FIG. 7 is an enlarged front view of a rocker arm end in the direction of arrow X of FIG. 6;

FIG. 8 is a longitudinal section view of the connecting member coupling the wiper with respect to the end of the corresponding oscillating arm;

FIG. 9 is a top plan view of same member of FIG. 8;

FIG. 10 is a perspective view of the spring fitted in the member of FIGS. 8 and 9;

FIGS. 11 and 12 are cross section views of the member of FIG. 8, along lines XI—XI and XII—XII; and;

FIG. 13 is a cross section view in a greater scale of said member of FIG. 8, along line XIII—XIII of same.

With reference to the drawings and as known, the support for the rubber wiper blade A, comprises a principal bar 15, moderately arcuated which carries centrally, through an articulate connection the connecting member 16 formed by a tile-shaped sheath; at the ends of bar 15 rocker arms 17 are connected through articulations.

According to the invention, both the bar 15 and member 16 as well as the rocker arms 17 are made of a suitable molded plastic material; the bar 15 and the rocker arms 17 have a cross section substantially elliptical and ribbed as respectively represented with 15a and 17a on FIGS. 3 and 4.

The U-shaped ends 15c are astride mounted on the central part of a smaller thickness 17b of the two rocker arms; ends 17c of each rocker arm 17, represented on FIGS. 6 and 7 are wider and provided with slit-shaped side by side formed seats 17d, having a transversal rectangular outline which is centrally narrowed by opposed tips 17e.

The connecting member 16 for the end of the oscillating arm is centrally astride mounted on the main bar 15, in a corresponding part 15b having a reduced thickness, FIG. 3.

As indicated on FIGS. 1, 4, 8 and 13 the articulate connection between member 16 and part 15 of the main bar 15 as well as the articulate connection between the ends 15c of said bar and the central part 17b of rocker arms 17, are realized by fixedly fitting tile-shaped metal plates, preferably of stainless steel, in the corresponding arcuated slits 20, 20a and 21, 21a, provided in the connecting member 16 and in the part 15b of bar 15, and in the central part 17b of each rocker arm and the ends 15c of bar 15, respectively. In order the mutually engaged parts by means of the plates 19 may result articulate, that is, free to oscillate moderately only in the plane parallel to the support, that is, in the plane passing vertically from the longitudinal center line of same, indicated by line y on FIG. 3, the internal arcuated seats of each articulation, that is, articulations 20a transversally formed at 15b in the bar 15 and articulations 21a formed at 17b in the rocker arms 17, are in the angular dimension wider than the circle arc $\alpha$ which determines the angular dimension of corresponding plate 19, and are further of a height $h$ such as to accommodate same plate 19 with moderate clearance so that the plate is allowed to freely move pendularly around its curvature centre; the arcuated seat 20, formed in member 16 and the analogous seats 21 formed in the ends of bar 15, on the contrary, accommodate fixedly the corresponding plates 19. It is clear that in these conditions while any transversal clearance between the parts is avoided, a remarkable flexibility is allowed to the support in the direction indicated by arrow P on FIGS. 1 and 2.

In seats 17d, formed in the ends 17c of rocker arms 17, are accommodated the known metal plates 26, FIGS. 1 and 2, which confine the back top of the wiper blade A, which has a known structure.

The outline with two opposed tips 17e of seats 17d for plates 26, allows the whole wiper support, by the aid of said blades 20 flexibility, to bend and adapt to the curvature of the glass to be wiped, under the pressure applied by the oscillating arm.

In the variant represented on FIGS. 2 and 2a, the plate 19a instead of being tile-shaped, is flat and is forced and fixed in the corresponding external seats with a rectangular outline, formed in the ends of the connecting member 16 and the ends 15a of rocker arma 15, while the seat formed at the top of bar 15 and in the middle of each rocker arm present a transversal outline with double tip formed in the ends 17c of rocker arms 17.

In both the described cases, the articulate connections provided by the use of plates 19 or 19a, between the parts forming the support for the wiper blade A, have substituted the usual cylindrical pins in order to remarkably enlarge the sliding surfaces between the articulation member and the seats of the articulate parts in order to minimize the wear of the articulation seat surfaces and hence any possible clearance between the articulate parts.

As represented on FIGS. 9 to 13, member 16 also, being of molded plastic, takes a shape different from that of the corresponding metal members and therefore the seat 16a for the elbow 22a of spring 22 is formed in the longitudinal edges 16b which determine its transversal outline substantially as a "C."

The support according to the invention results light, practical, perfectly weatherproof and of a reduced manufacturing cost as compared with analogous metal supports.

I claim:

1. Support made of molded plastic, for wiper blades of windscreen wiper equipments on motor vehicles, characterized in that the articulate coupling between the connecting member and the main bar of the support as well as between the ends of the bar and the central point of each rocker arm, is provided by metal plates engaging corresponding transversal seats which are coinciding and formed in the articulation points.

2. Support according to claim 1, characterized in that the metal plates which substitute the articulation pins are arcuated and work in the seats of the internal parts, while they are fixedly fitted in the corresponding arcuated seats of the external parts.

3. Support according to claim 1, characterized in that the articulation plates are flat and fixedly fitted in corresponding seats, with a rectangular outline, formed in the external parts while they result freely oscillable with respect to seats, having an outline with two opposed tips, formed in the inner parts which are articulate with respect to the external parts.

4. Support for wiper blades according to claim 1, wherein all the components, except the articulation plates and the lamina backing the rubber blade, are made of molded plastic and the principal bar with the rocker arms have a cross section substantially elliptical and variable, with stiffening ribs.

* * * * *